US008817278B2

(12) United States Patent
Maekawa

(10) Patent No.: US 8,817,278 B2
(45) Date of Patent: Aug. 26, 2014

(54) INFORMATION PROCESSING APPARATUS, INFORMATION PROCESSING METHOD AND COMPUTER-READABLE MEDIUM FOR JOB SETTINGS FOR DEVICE FUNCTIONS

(75) Inventor: Takao Maekawa, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 687 days.

(21) Appl. No.: 12/543,959

(22) Filed: Aug. 19, 2009

(65) Prior Publication Data

US 2010/0165374 A1 Jul. 1, 2010

(30) Foreign Application Priority Data

Dec. 25, 2008 (JP) ................................. 2008-329076

(51) Int. Cl.
*G06F 3/12* (2006.01)

(52) U.S. Cl.
USPC .............. 358/1.13; 358/1.16; 713/1; 715/747; 726/4

(58) Field of Classification Search
USPC ......... 341/50; 358/1.13, 1.14, 1.15, 1.16, 1.9, 358/474; 370/352; 455/420; 713/1; 715/747; 726/4
See application file for complete search history.

(56) References Cited

U.S. PATENT DOCUMENTS

| 2004/0102898 A1 * | 5/2004 | Yokota et al. ................. 701/210 |
| 2006/0291453 A1 * | 12/2006 | Kuwahara ..................... 370/352 |
| 2008/0055646 A1 | 3/2008 | Kawabata |
| 2008/0151277 A1 * | 6/2008 | Park ............................... 358/1.9 |
| 2008/0174817 A1 | 7/2008 | Nemoto et al. |
| 2008/0304103 A1 * | 12/2008 | Furutani ....................... 358/1.15 |
| 2009/0024582 A1 * | 1/2009 | Chung et al. ....................... 707/3 |

FOREIGN PATENT DOCUMENTS

| CN | 101231576 A | 7/2008 |
| JP | 2001-350606 A | 12/2001 |
| JP | 2004-112067 A | 4/2004 |
| JP | 2006-11526 A | 1/2006 |
| JP | 2006-067210 A | 3/2006 |
| JP | 2006-224523 A | 8/2006 |
| JP | 2008-015669 A | 1/2008 |
| JP | 2008-33597 A | 2/2008 |
| JP | 2008-059489 A | 3/2008 |
| JP | 2009-181401 A | 8/2009 |

(Continued)

OTHER PUBLICATIONS

English translation of Japanese Office Action issued on Jan. 15, 2013 in Japanese Application No. 2008-329076.

(Continued)

*Primary Examiner* — David S Cammack
(74) *Attorney, Agent, or Firm* — Sughrue Mion, PLLC

(57) ABSTRACT

An information processing apparatus includes a storage device, a selection unit, a registration unit and a setting unit. The storage device is configured to store an execution condition that associates setting items which are set for execution of a process with setting values for the setting items. The selection unit selects, from among the setting items, a part of the setting items. The registration unit registers, in the storage device, the part of the setting items selected by the selection unit and setting values for the part of the setting item as an execution condition. When the execution condition stored in the storage device is selected in setting values for setting items to execute a process, the setting unit sets a setting value for a setting item corresponding to the selected execution condition to the setting value stored in the storage device.

17 Claims, 16 Drawing Sheets

(56) References Cited

FOREIGN PATENT DOCUMENTS

| | | | |
|---|---|---|---|
| JP | 2009198838 A | * | 9/2009 |
| JP | 2009-303024 A | | 12/2009 |
| JP | 2010-111024 A | | 5/2010 |

OTHER PUBLICATIONS

Office Action, dated Jun. 25, 2013, issued by the Japanese Patent Office in counterpart Japanese Patent Application No. 2008-329076.

Office Action dated Jul. 1, 2013, issued by the State Intellectual Property Office of P.R.C in corresponding application No. 200910205564.8.

Office Action dated Oct. 22, 2012, issued by the Korean Intellectual Property Office in counterpart Korean Patent Application No. 10-2009-0085987.

* cited by examiner

FIG. 3

PARAMETER INITIAL VALUE

| FUNCTION | PARAMETER | INITIAL VALUE |
|---|---|---|
| READING SYSTEM FUNCTION | ORIGINAL DOCUMENT SIZE | AUTOMATIC DETECTION |
| | DOUBLE-SIDED DOCUMENT | SINGLE-SIDED |
| | PAGE CONTINUOUS MODE | OFF |
| | EDGE ERASING AMOUNT | TOP AND BOTTOM 2 mm RIGHT AND LEFT 2 mm MIDDLE 3 mm |
| | MIXED SIZE | OFF |
| | AUTOMATIC IMAGE ROTATION | OFF |
| PRINTING/OUTPUTTING SYSTEM FUNCTION | DOUBLE-SIDED OUTPUT | SINGLE-SIDED |
| | N-up | OFF |
| | SORTING | SORT |
| | STAPLING | OFF |
| | PUNCHING | OFF |

FIG. 5

| JOB MEMORY REGISTRATION SCREEN | | |
|---|---|---|
| FUNCTION NAME | PARAMETER NAME | PARAMETER VALUE |
| READING SYSTEM FUNCTION | ORIGINAL DOCUMENT SIZE | AUTOMATIC DETECTION |
| | DOUBLE-SIDED DOCUMENT SPECIFICATION | DOUBLE-SIDED |
| | PAGE CONTINUOUS MODE | ON (LEFT-BOUND DOCUMENT) |
| | EDGE ERASING AMOUNT | TOP AND BOTTOM 3 mm/RIGHT AND LEFT 2 mm/MIDDLE 3 mm |
| | MIXED SIZE SPECIFICATION | OFF |
| | AUTOMATIC IMAGE ROTATION | ON |
| PRINTING/OUTPUTTING SYSTEM FUNCTION | DOUBLE-SIDED OUTPUT | DOUBLE-SIDED PRINTING |
| | N-up SPECIFICATION | 2-up |
| | SORTING | SORT |
| | STAPLING | UPPER LEFT |
| | PUNCHING | TWO LEFT HOLES |

☑ DIVIDED REGISTRATION     [ REGISTER ]

| FUNCTION SET NAME | DOUBLE-SIDED LEFT BOUND READING |
|---|---|
| REGISTRATION DATE AND TIME | 2008/7/10 10:30 |
| READING SYSTEM FUNCTION GROUP | PRESENT |
| ORIGINAL DOCUMENT SIZE | AUTOMATIC DETECTION |
| DOUBLE-SIDED DOCUMENT SPECIFICATION | DOUBLE-SIDED |
| PAGE CONTINUOUS MODE | ON (LEFT-BOUND DOCUMENT) |
| EDGE ERASING AMOUNT | TOP AND BOTTOM 3 mm/RIGHT AND LEFT 2 mm/ MIDDLE 3 mm |
| MIXED SIZE SPECIFICATION | OFF |
| AUTOMATIC IMAGE ROTATION | ON |
| PRINTING/OUTPUTTING SYSTEM FUNCTION GROUP | NONE |

(CONT.1)

JOB MEMORY

| NUMBER | USE/NON-USE | ... | REGISTERED CONTENTS |
|---|---|---|---|
| 50 | BEING USED | | |

(FIG.6 Continued)

| FUNCTION SET NAME | DOUBLE-SIDED STAPLING/PUNCHING 2-up PRINTING |
|---|---|
| REGISTRATION DATE AND TIME | 2008/7/10 10:30 |
| READING SYSTEM FUNCTION GROUP | NONE |
| PRINTING/OUTPUTTING SYSTEM FUNCTION GROUP | PRESENT |
| DOUBLE-SIDED OUTPUT | DOUBLE-SIDED PRINTING |
| N-up SPECIFICATION | 2-up |
| SORTING | SORT |
| STAPLING | UPPER LEFT |
| PUNCHING | TWO LEFT HOLES |

| 50 | BEING USED | |
|---|---|---|
| 51 | REGISTERED CONTENTS | UNUSED |
| | | — |
| | | ... |

FIG. 9

JOB MEMORY REGISTRATION SCREEN

| FUNCTION NAME | PARAMETER NAME | PARAMETER VALUE |
|---|---|---|
| ☑ READING SYSTEM FUNCTION | ORIGINAL DOCUMENT SIZE | AUTOMATIC DETECTION |
| | DOUBLE-SIDED DOCUMENT SPECIFICATION | DOUBLE-SIDED |
| | PAGE CONTINUOUS MODE | ON (LEFT-BOUND DOCUMENT) |
| | EDGE ERASING AMOUNT | TOP AND BOTTOM 3 mm/RIGHT AND LEFT 2 mm/MIDDLE 3 mm |
| | MIXED SIZE SPECIFICATION | OFF |
| | AUTOMATIC IMAGE ROTATION | ON |
| ☐ PRINTING/OUTPUTTING SYSTEM FUNCTION | DOUBLE-SIDED OUTPUT | DOUBLE-SIDED PRINTING |
| | N-up SPECIFICATION | 2-up |
| | SORTING | SORT |
| | STAPLING | UPPER LEFT |
| | PUNCHING | TWO LEFT HOLES |

[REGISTER] ~41

JOB MEMORY REGISTRATION SCREEN

| | FUNCTION NAME | PARAMETER NAME | PARAMETER VALUE |
|---|---|---|---|
| ☑ | READING SYSTEM FUNCTION | ORIGINAL DOCUMENT SIZE | AUTOMATIC DETECTION |
| | | ☑ DOUBLE-SIDED DOCUMENT SPECIFICATION | DOUBLE-SIDED |
| | | ☑ PAGE CONTINUOUS MODE | ON (LEFT-BOUND DOCUMENT) |
| | | ☑ EDGE ERASING AMOUNT | TOP AND BOTTOM 3 mm/RIGHT AND LEFT 2 mm/MIDDLE 3 mm |
| | | ☑ MIXED SIZE SPECIFICATION | OFF |
| | | ☑ AUTOMATIC IMAGE ROTATION | ON |
| ☑ | PRINTING/OUTPUTTING SYSTEM FUNCTION | ☑ DOUBLE-SIDED OUTPUT | DOUBLE-SIDED PRINTING |
| | | ☑ N-up SPECIFICATION | 2-up |
| | | ☑ SORTING | SORT |
| | | ☐ STAPLING | UPPER LEFT |
| | | ☐ PUNCHING | TWO LEFT HOLES |

[REGISTER] ~41

48 — checkboxes; 49 — parameter groupings

FIG. 11

JOB MEMORY

| NUMBER | USE/NON-USE | ... | REGISTERED CONTENTS |
|---|---|---|---|
| 50 | | BEING USED | |

| FUNCTION SET NAME | DOUBLE-SIDED LEFT BOUND READING |
|---|---|
| REGISTRATION DATE AND TIME | 2008/7/10 10:30 |
| READING SYSTEM FUNCTION GROUP | PRESENT |
| ORIGINAL DOCUMENT SIZE | AUTOMATIC DETECTION |
| DOUBLE-SIDED DOCUMENT SPECIFICATION | DOUBLE-SIDED |
| PAGE CONTINUOUS MODE | ON (LEFT-BOUND DOCUMENT) |
| EDGE ERASING AMOUNT | TOP AND BOTTOM 3 mm/RIGHT AND LEFT 2 mm/ MIDDLE 3 mm |
| MIXED SIZE SPECIFICATION | OFF |
| AUTOMATIC IMAGE ROTATION | ON |
| PRINTING/OUTPUTTING SYSTEM FUNCTION GROUP | NONE |

| 50 | BEING USED |
| --- | --- |
|  | REGISTERED CONTENTS |
| 51 | UNUSED |
|  | — |
|  | . |
|  | . |
|  | . |

| FUNCTION SET NAME | DOUBLE-SIDED 2-up PRINTING |
| --- | --- |
| REGISTRATION DATE AND TIME | 2008/7/10  10:30 |
|  |  |
| READING SYSTEM FUNCTION GROUP | NONE |
|  |  |
| PRINTING/OUTPUTTING SYSTEM FUNCTION GROUP | PRESENT |
| DOUBLE-SIDED OUTPUT | DOUBLE-SIDED PRINTING |
| N-up SPECIFICATION | 2-up |
| SORTING | SORT |

FIG. 12

FUNCTION AND SETTING ITEM LIST

| FUNCTION | SETTING ITEM CLASSIFICATION | SETTING ITEM | SETTING VALUE |
|---|---|---|---|
| SCANNING FUNCTION | DOCUMENT SETTING ITEM GROUP | ORIGINAL DOCUMENT SIZE SETTING | A3/A4/A5/B4/B5/POSTCARD |
| | | PAGE CONTINUOUS SETTING | OFF/LEFT-BOUND/RIGHT-BOUND |
| | | MIXED-SIZE SETTING | ON/OFF |
| | | COLOR MODE SETTING | COLOR/BLACK AND WHITE/AUTOMATIC |
| | | DOCUMENT IMAGE QUALITY SETTING | AUTOMATIC/TEXT/PHOTO/MAP |
| | READING CONDITION SETTING ITEM GROUP | DOUBLE-SIDED DOCUMENT SETTING | SINGLE-SIDED/RIGHT AND LEFT DOUBLE-SIDED/TOP AND BOTTOM DOUBLE-SIDED |
| | | RESOLUTION SETTING | 200dpi/400dpi/600dpi |
| | | READING MAGNIFICATION SETTING | 50%/70%/100%/141% |
| | IMAGE QUALITY SETTING ITEM GROUP | READING DENSITY SETTING | 1 - 7 |
| | | GROUND COLOR REMOVAL SETTING | ON/OFF |
| | | CONTRAST SETTING | 1 - 5 |
| | | EDGE ERASING SETTING | ON/OFF |
| | COMPUTERIZATION SETTING ITEM GROUP | FILE FORMAT SETTING | TIFF/JPEG/PDF |
| | | IMAGE COMPRESSION RATE SETTING | HIGH/STANDARD/LOW |
| | | DOCUMENT NAME SETTING | DATE/OPTIONAL INPUT |

| PRINTING FUNCTION | IMPOSITION SETTING ITEM GROUP | DOUBLE-SIDED OUTPUT SETTING | SINGLE-SIDED/DOUBLE-SIDED |
|---|---|---|---|
| | | N-up SETTING | OFF/2 SHEETS/4 SHEETS/8 SHEETS |
| | | BINDING DIRECTION SETTING | OFF/LEFT-BOUND/RIGHT-BOUND |
| | | BOOKBINDING SETTING | OFF/OUTPUT SIZE SPECIFICATION/MAGNIFICATION SPECIFICATION |
| | | ENLARGED CONTINUOUS PRINTING SETTING | |
| | FINISHING SETTING ITEM GROUP | SORTING SETTING | SORT/STACK |
| | | STAPLING SETTING | OFF/UPPER LEFT/TWO LEFT POSITIONS/TOP/UPPER RIGHT/TWO RIGHT POSITIONS |
| | | PUNCHING SETTING | OFF/LEFT/RIGHT/TOP |
| | | FOLDING SETTING | OFF/Z FOLD/HALF FOLD |
| | SHEET-RELATED SETTING ITEM GROUP | SHEET TYPE SETTING | ORDINARY PAPER/HIGH-QUALITY PAPER/RECYCLED PAPER/OHP SHEET |
| | | SHEET SIZE SETTING | A3/A4/A5/B4/B5/POSTCARD |
| | | SHEET TRAY SELECTION SETTING | TRAY 1/TRAY 2/TRAY 3/MANUAL FEED TRAY |
| | BASIC SETTING ITEM GROUP | COPY SETTING | COLOR/BLACK AND WHITE/TWO COLORS |
| | | COLOR MODE SETTING | AUOTMOTIC/100%/141%/70% |
| | | SCALING FACTOR SETTING | 1 - 5 |
| | | PRINTING DENSITY SETTING | |

| | DESTINATION SETTING ITEM GROUP | TRANSMISSION DESTINATION SETTING | SPECIFIED DESTINATION |
|---|---|---|---|
| FACSIMILE TRANSMISSION FUNCTION | | MULTIPLE ADDRESS TRANSMISSION SETTING | MULTIPLE SPECIFIED DESTINATIONS/GROUP NUMBER SPECIFICATION/WILDCARD |
| | COMMUNICATION CONDITION SETTING ITEM GROUP | COMMUNICATION MODE SETTING | G3/G4/INTERNATIONAL COMMUNICATION |
| | | TIME-SPECIFIED TRANSMISSION SETTING | TIME SETTING |
| | | CONFIDENTIAL TRANSMISSION SETTING | BOX NUMBER |
| | TRANSMISSION IMAGE SETTING ITEM GROUP | TRANSMISSION DENSITY SETTING | 1 - 7 |
| | | PARALLEL COMPOSITION TRANSMISSION | SHEET COUNT SPECIFICATION |
| IMAGE TRANSMISSION FUNCTION | | | |

INFORMATION PROCESSING APPARATUS, INFORMATION PROCESSING METHOD AND COMPUTER-READABLE MEDIUM FOR JOB SETTINGS FOR DEVICE FUNCTIONS

CROSS-REFERENCE TO RELATED APPLICATIONS

This application is based on and claims priority under 35 USC 119 from Japanese Patent Application No. 2008-329076 filed on Dec. 25, 2008.

BACKGROUND

1. Technical Field

The present invention relates to an information processing apparatus, an information processing method and a computer-readable medium storing a program that causes a computer to execute information processing.

2. Related Art

A multifunction machine is capable of executing various processing functions such as scanning, copying, printing and faxing. A user is allowed to execute a process by combining these functions. For execution of a process by combining these functions, a user is required to set parameter values for respective functions such as a reading condition, and an output condition. A multifunction machine of a related art has a job memory function for collectively storing settings of parameters in a job memory, and for collectively reading the stored settings of the parameters from the job memory when a subsequent process is executed, to thereby enable reutilization of the stored settings.

SUMMARY

According to an aspect of the invention, an information processing apparatus includes a storage device, a selection unit, a registration unit and a setting unit. The storage device is configured to store an execution condition that associates setting items which are set for execution of a process with setting values for the setting items. The selection unit selects, from among the setting items, a part of the setting items. The registration unit registers, in the storage device, the part of the setting items selected by the selection unit and setting values for the part of the setting item as an execution condition. When the execution condition stored in the storage device is selected in setting values for setting items to execute a process, the setting unit sets a setting value for a setting item corresponding to the selected execution condition to the setting value stored in the storage device.

BRIEF DESCRIPTION OF THE DRAWINGS

Exemplary embodiments of the invention will be described in detail below based on the accompanying drawings, wherein:

FIG. 3 is a diagram showing a data structure example for initial values registered in advance in an initial value storage section according to the exemplary embodiment 1;

FIG. 5 is a diagram showing a display example of a job memory registration screen according to the exemplary embodiment 1;

FIG. 6 is a diagram showing a data structure example of a job memory and data structure examples of function sets according to the exemplary embodiment 1;

FIG. 9 is a diagram showing a display example of a job memory registration screen according to an exemplary embodiment 2;

FIG. 10 is a diagram showing a display example of a job memory registration screen according to an exemplary embodiment 3;

FIG. 11 is a diagram showing a data structure example of a job memory and data structure examples of function sets according to the exemplary embodiment 3; and FIG. 12 is a diagram showing an example of a list of functions and setting items.

DETAILED DESCRIPTION

Hereinafter, exemplary embodiments of the present invention will be described with reference to the drawings.

Exemplary Embodiment 1

Figure 1:
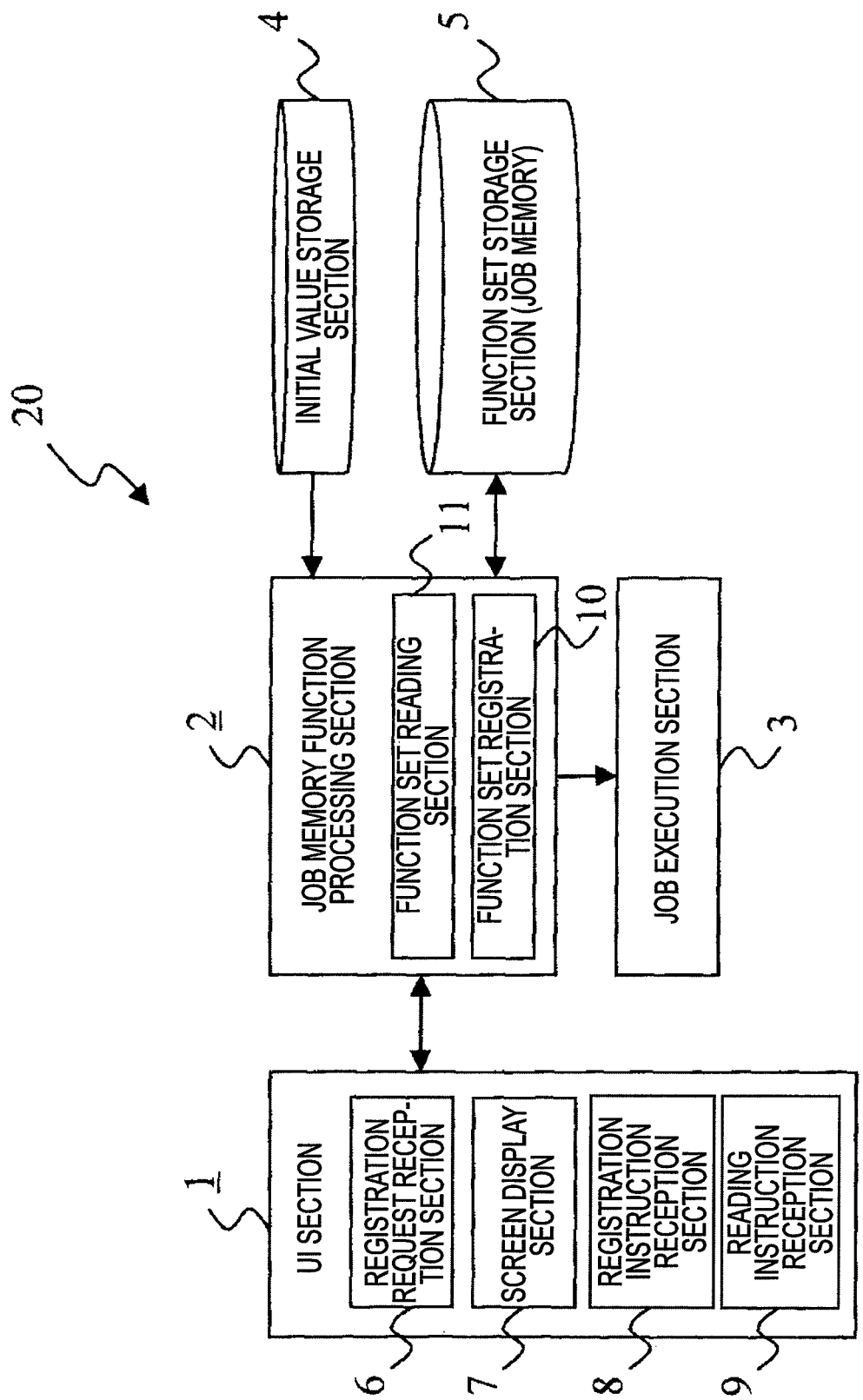
FIG. 1 is a block configuration diagram showing an information processing apparatus according to an exemplary embodiment 1 of the present invention.

FIG. 1 is a block configuration diagram showing an information processing apparatus according to one exemplary embodiment of the present invention. The information processing apparatus according to the present exemplary embodiment is implemented by a computer incorporated into a multifunction machine 20 having processing functions such as scanning, copying, printing and faxing. The multifunction machine 20 of the present exemplary embodiment serves as an image forming apparatus equipped with at least two or more of those functions. It should be noted that FIG. 1 shows only constituent components which are necessary to describe the present exemplary embodiment.

Figure 2:
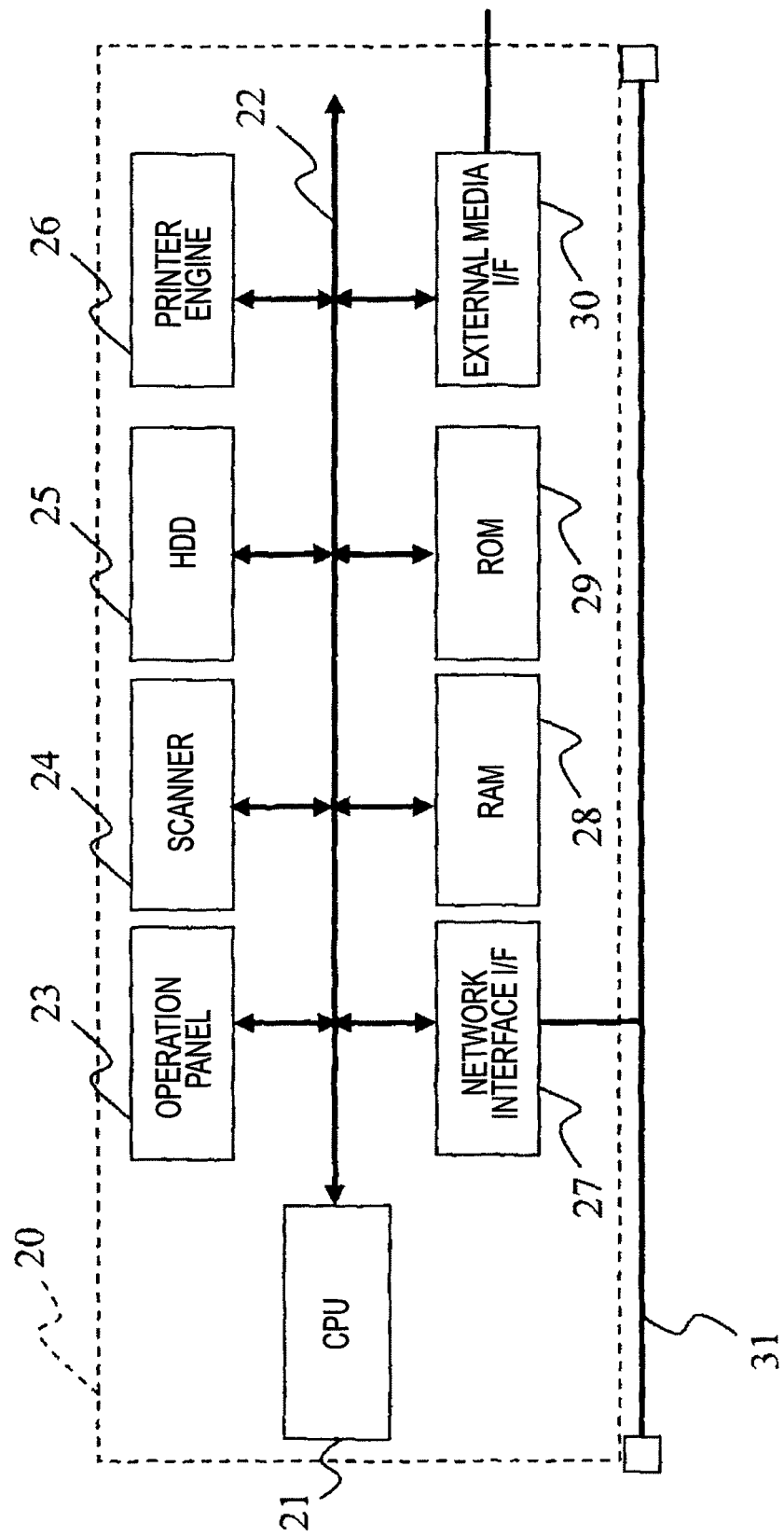
FIG. 2 is the hardware configuration diagram of a multifunction machine according to the exemplary embodiment 1.

FIG. 2 is a hardware configuration diagram of the multifunction machine 20 according to the present exemplary embodiment. Referring to FIG. 2, a CPU 21 control operations of various types of devices incorporated into this machine, such as a scanner 24 and a printer engine 26, in accordance with a program stored in a ROM 29. An address data bus 22 is connected to the various types of devices to be controlled by the CPU 21, to thereby enable data communication therebetween. An operation panel 23 receives an instruction from a user, and displays information. The scanner 24 reads an original document which is placed thereon by a user, and accumulates electronic data of the original document in a HDD (Hard Disk Drive) 25 or the like. The HDD 25 stores an electronic document which is read with the scanner 24. The printer engine 26 prints an image on an output sheet in accordance with an instruction from a control program executed by the CPU 21. A network interface (I/F) 27 is connected to a network 31, and is used to receive a job sent from another apparatus, to transmit job execution result information, and/or to accept access of another apparatus to this machine via a browser, for example. A RAM 28 is used as a work memory at the time of program execution, and/or a communication buffer at the time of electronic data transmission/reception. The ROM 29 stores various programs concerning the control of this machine, encryption of electronic data, and/or electronic data transmission/reception. Execution of the various programs allows respective constituent components described later to achieve predetermined processing functions. An external media interface (I/F) 30 serves as an interface with an external memory device such as a USB memory or a flash memory.

Referring again to FIG. 1, the multifunction machine 20 of the present exemplary embodiment includes a user interface (UI) section 1, a job memory function processing section 2, a job execution section 3, an initial value storage section 4, and a function set storage section 5. The user interface (UI) section 1 includes a registration request reception section 6, a screen display section 7, a registration instruction reception section 8 and a reading instruction reception section 9. The registration request reception section 6 receives a request for registration of a parameter value(s). The screen display section 7 displays a job memory registration screen on the operation panel 23. The registration instruction reception section 8 receives an instruction for registration to the function set storage section 5. The reading instruction reception section 9 receives a reading instruction for reading registration contents from the function set storage section 5. The job memory function processing section 2 executes a job memory function. The job memory function processing section 2 of the present exemplary embodiment acquires, from the initial value storage section 4 or the function set storage section 5, a parameter value(s) to be displayed on the parameter setting screen in accordance with a job execution request. Further, the job memory function processing section 2 includes a function set registration section 10 and a function set reading section 11. The function set registration section 10 generates a function set including a parameter value(s) which are set in response to a registration instruction from a user. The function set registration section 10 registers the generated function set in the function set storage section 5. The function set reading section 11 reads a function set(s) from the function set storage section 5 in response to an instruction from a user. The job execution section 3 executes a processing function which is set in a job in accordance with the set parameter value(s). The initial value storage section 4 serves as a storage device in which an initial value of each parameter is set. FIG. 3 shows a data structure example for initial values registered in advance in this initial value storage section 4. In the function set storage section 5 of the present exemplary embodiment, parameters which are set for execution of respective functions are associated with setting values for these parameters, and the parameters and the setting values are collectively stored for each function. The function set will be described later.

The respective constituent components 23 to 30 of the multifunction machine 20 are implemented by a cooperative operation of the computer incorporated into the multifunction machine 20 and the program operated by the CPU 21 incorporated into the computer. Further, the initial value storage section 4 and the function set storage section 5 are implemented by the HDD 25 incorporated into the multifunction machine 20.

Furthermore, programs used in the present exemplary embodiment may naturally be provided by a communication device, and may also be provided in such a form that the programs are stored in a computer-readable recording medium such as a CD-ROM or a DVD-ROM. The programs provided from the communication device and/or the recording medium are installed on the computer, and the CPU of the computer executes the installed programs in sequence, to thereby realize various processes.

Now, the function set will be described. In the present exemplary embodiment, the description will be made about the case in which a job, serving as an example of a process, is executed by the information processing apparatus incorporated into the multifunction machine 20, and the job is realized by a combination of plural functions. Further, in order to execute respective functions, parameter values are set in advance for various parameters necessary for execution of the functions. If it is required to input a setting value for a setting item each time a process is executed, a setting operation becomes troublesome for a user who wishes to repeatedly execute the same process, and the user might conceivably make a setting mistake. Therefore, there is a case in which such a combination of a setting item and a setting value is registered in a storage device inside the multifunction machine or outside the multifunction machine, and the registered combination of the setting item and setting value is read prior to process execution, to thereby enable to restore desired settings. Such a combination of a setting item(s) and a setting value(s) will be referred to as a "job memory", for example. It should be noted that in the present exemplary embodiment, the terms "parameter" and "setting item" are used as synonyms. In the present exemplary embodiment, values which are set as respective parameters for execution of respective functions are stored in the function set storage section 5 in a collective manner for each function. Specifically, the term "function set" refers to a data group in which a set of (i) a parameter name(s), serving as exemplary parameter identification information and (ii) a parameter value(s) for each parameter name is included for each function. Examples of the function set include (i) function sets for a reading system, such as an original document size, double-sided document, document image quality, edge erasing amount, and page continuous mode, (ii) function sets for a printing/outputting system, such as double-sided output, N-up (function for collectively printing plural pages onto a single sheet), sorting, and stapling/punching, and (iii) function sets for a document transmission system, such as a transmission destination for faxing, a communication mode for faxing, a transmission address for mail transmission, a file dividing method for mail transmission, a compression setting for mail transmission, a directory for network transfer, and a user name and a password of a transfer destination PC for network transfer.

Figure 4:
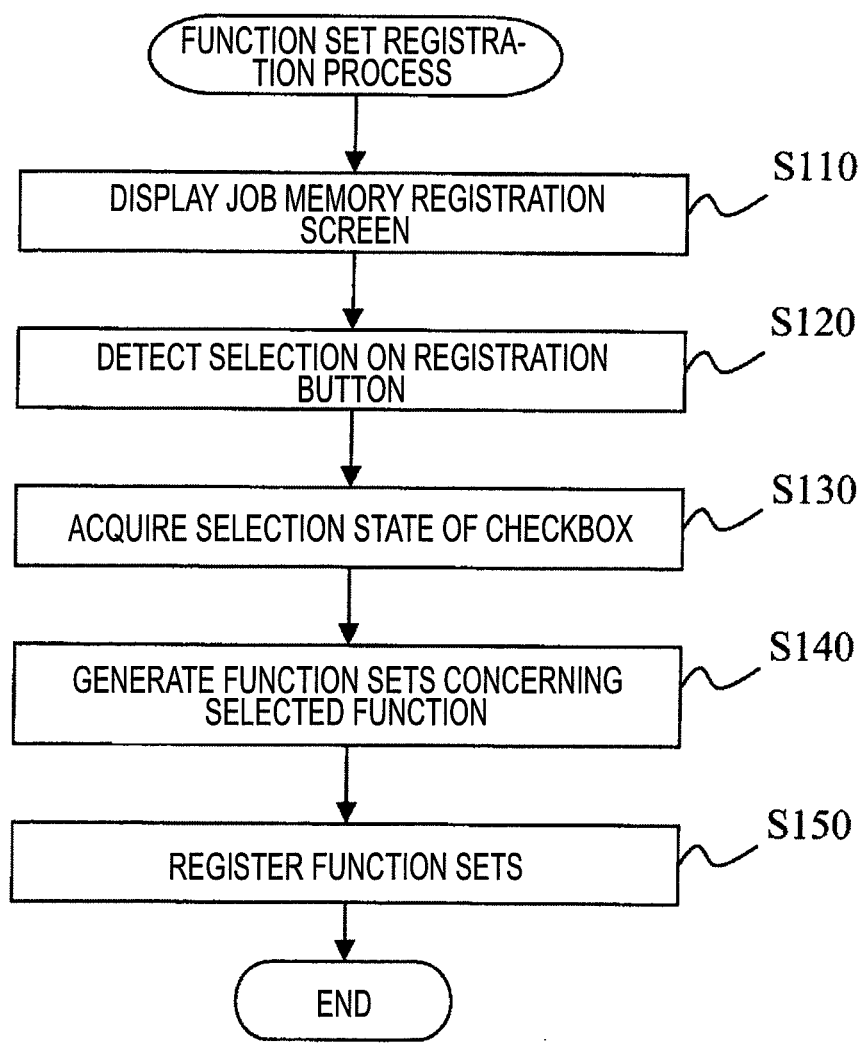
FIG. 4 is a flow chart showing a job memory registration process according to the exemplary embodiment 1.

Next, operations carried out in the present exemplary embodiment will be described. First, a process for registering a function set in the function set storage section 5 of the present exemplary embodiment will be described with reference to a flow chart shown in FIG. 4.

A user who wishes to execute a desired job operates the operation panel 23 of the multifunction machine 20, to thereby have a predetermined parameter setting screen (not shown) displayed. Then, the user sets a parameter(s) necessary for execution of the job through this parameter setting screen. Generally, parameter setting is carried out, for example, by displaying an initial value(s) on the parameter setting screen, and by selecting each parameter value from among selection candidates when the user wishes to change the initial value(s). Basically, the job memory function processing section 2 of the present exemplary embodiment also carries out parameter setting by the similar process.

In this case, when set contents are desired to be registered in the function set storage section 5, the user performs a predetermined operation, to thereby issue a parameter value registration request. When the registration request reception section 6 receives the registration request, the job memory function processing section 2 generates a job memory registration screen. The screen display section 7 displays the generated job memory registration screen on the operation panel 23 (Step 110).

FIG. 5 is a diagram showing a display example of the job memory registration screen according to the present exemplary embodiment. As is apparent from FIG. 5, sets of parameter names and parameter setting values for the parameter names are displayed separately for each function. The displayed parameter values are values which are set by a user.

In this exemplary embodiment, when a user wishes to store the parameter values displayed on the screen in the function set storage section 5, the user clicks and selects a registration button 41 which is provided as a registration instruction component on the screen. In the present exemplary embodiment, a checkbox 42 is provided so that the user can select either (i) registration which is performed in a divided manner or (ii) registration which is performed in a collective manner. In this exemplary embodiment, the registration button 41 is clicked and selected after the checkbox 42 has been checked as illustrated in FIG. 5. It should be noted that when the checkbox 42 is not checked, a registration process is performed in the same manner as the related art, and therefore, description thereof will be omitted.

When the registration instruction reception section 8 has received an instruction for registration to the function set storage section 5 by detecting the selection operation which is performed on the registration button 41 (Step 120), the job memory function processing section 2 first confirms a selection state of the checkbox 42 in response to the registration instruction (Step 130). In this exemplary embodiment, description will be given on the assumption that the checkbox 42 has been checked. In this case, the function set registration section 10 of the job memory function processing section 2 divides, for each function, the sets of the parameter names and the parameter setting values for the parameter names, which have been displayed on the job memory registration screen. More specifically, in the example of FIG. 5, the function set registration section 10 divides the functions, provided by the multifunction machine 20, into (i) a function group including the reading system function and (ii) a function group including the printing/outputting system function, thus generating two function sets (Step 140). It should be noted that in FIG. 5, only the two functions are shown for the sake of expediency. Then, the generated two function sets are each registered as a job memory in the function set storage section 5 (Step 150).

FIG. 6 is a diagram showing a data structure example of the job memory 5 and data structure examples of function sets according to the present exemplary embodiment. In the function set storage section 5, an area 53 in which information concerning a function set is stored, a flag area 54 in which it is set whether or not this area 53 is used, and an area 55 in which an identification number of a set of these pieces of information 53 and 54 concerning the function set is set are registered in a manner that associates the area 55 with the areas 53 and 54. It should be noted that a method for determining a registration position of a function set in a job memory and data management, such as deletion, will not be described because they are not main points of the present exemplary embodiment.

The information concerning a function set is formed to include (i) a function set name for allowing a user to identify this function set and (ii) a date and time at which the function set is registered to the function set storage section 5. A user may be allowed to input a function set name after selection of the registration button 41. Also, registrant information such as a registrant's name and identification number of the registrant, access control information concerning the utilization of the function set, etc. may be added. As is apparent from FIG. 6, when an instruction for divided registration is given by checking the checkbox 42, parameter values which are set for a single job are grouped for each function so as to be registered individually.

Figure 7:
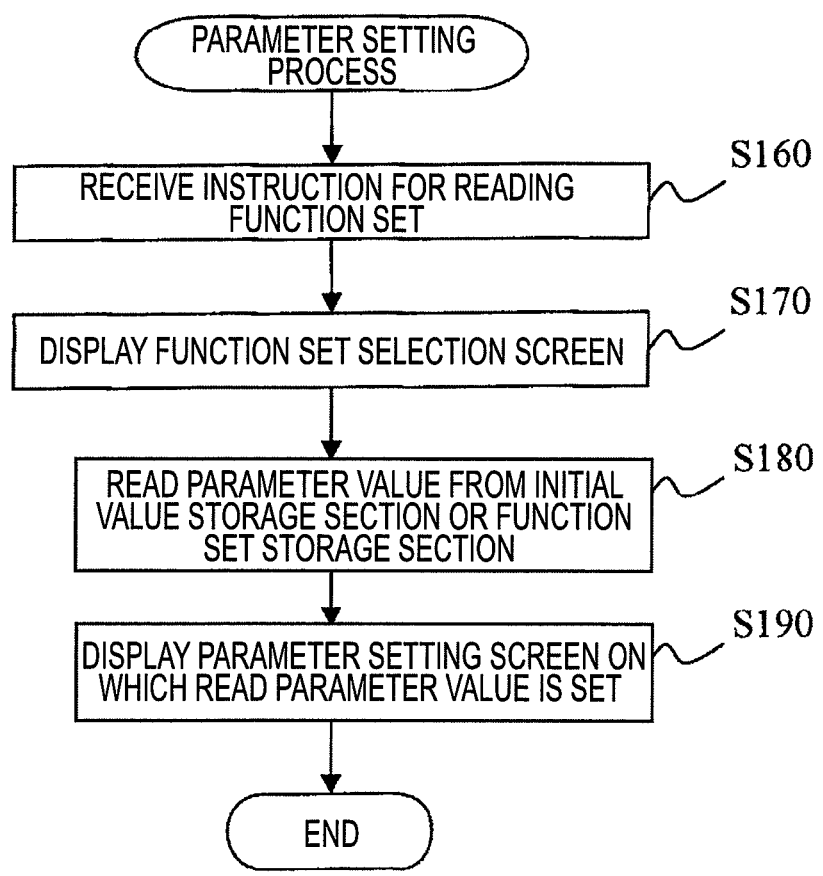
FIG. 7 is a flow chart showing a parameter setting process according to the exemplary embodiment 1.

Next, a parameter value setting process which is performed utilizing a function set registered in the function set storage section 5 will be described with reference to a flow chart shown in FIG. 7.

A user who wishes to execute a desired job operates the operation panel 23 of the multifunction machine 20, to thereby have a predetermined parameter setting screen (not shown) displayed. Then, the user sets a parameter(s) necessary for execution of the job through this parameter setting screen. In this case, when a function set registered in the function set storage section 5 is desired to be utilized, upon carrying out of a predetermined reading instruction operation by the user, the reading instruction reception section 9 receives a reading instruction provided by this operation (Step 160). Then, the job memory function processing section 2 reads, in response to the reading instruction, the function set names registered in the function set storage section 5, and causes the screen display section 7 to display a function set selection screen, which is set so as to be displayed at a predetermined position on the operation panel 23 (Step 170).

Figure 8:
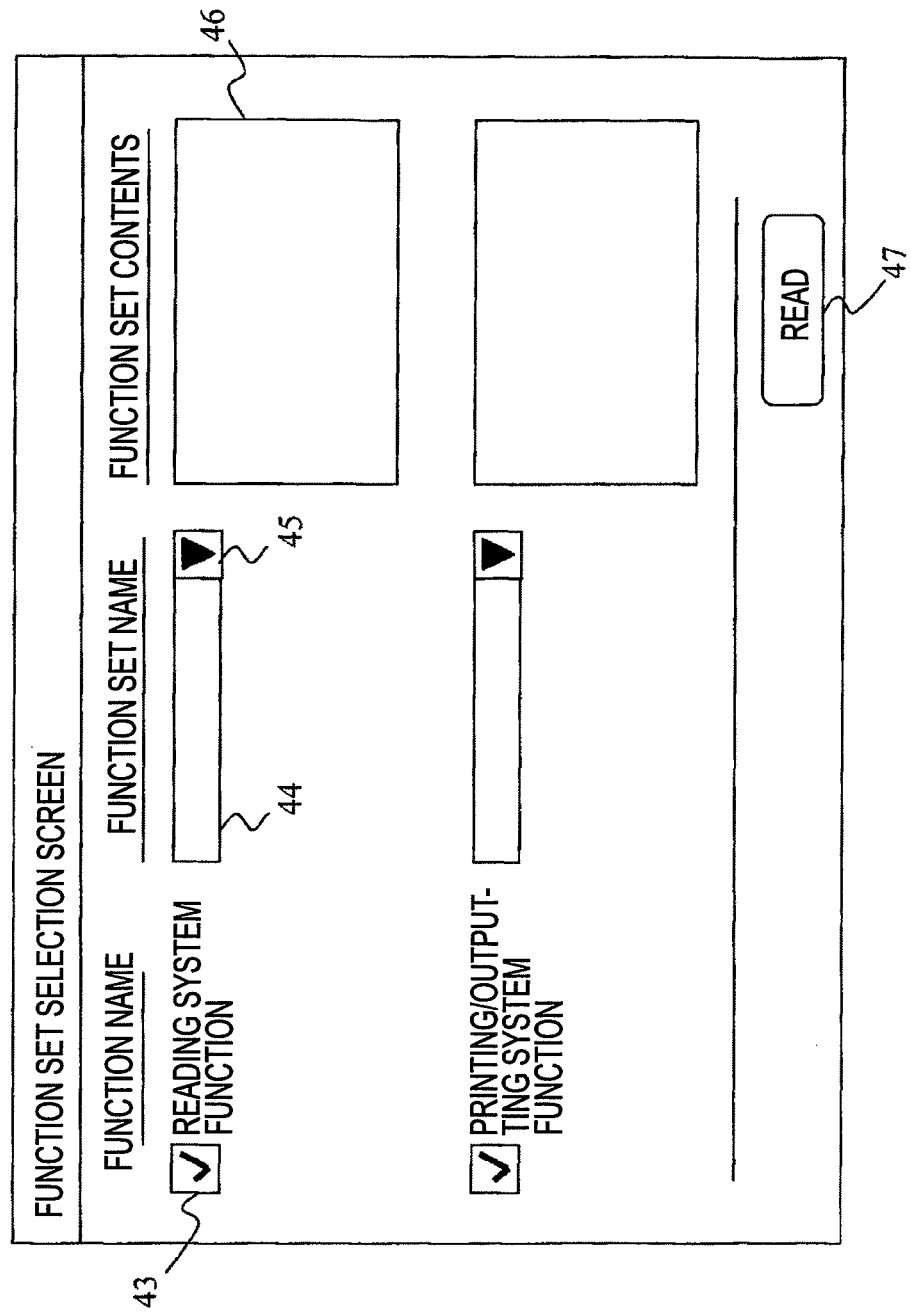
FIG. 8 is a diagram showing a display example of a function set selection screen according to the exemplary embodiment 1.

FIG. 8 is a diagram showing a display example of the function set selection screen displayed on the operation panel 23 in the present exemplary embodiment. FIG. 8 shows, for each function, a set of a function name, a display area 44, a button 45, a parameter display area 46 and a checkbox 43. A function set name, which is selected by the user from among function sets related to this function, is displayed on the display area 44. The button 45 is used to display the function sets related to this function in a list form. A set(s) of a parameter name(s) and a setting value(s) for the parameter names, which are included in the function set displayed on the display area 44, are display in the parameter display area 46. The checkbox 43 is checked when the selected function set is used.

The user checks the checkbox 43 corresponding to a function including a function set that he/she wishes to use, and operates the button 45, to thereby display, in the list form, function set names related to this function on a pull-down menu. Then, the user selects the function set that he/she wishes to use from the list. Since contents of the selected function set are displayed in the parameter display area 46, the user can confirm each parameter value.

Upon click-selection of a setting button 47 by the user after the function set has been selected as necessary, the function set reading section 11 of the job memory function processing section 2 operates as follows. For the function for which the checkbox 43 is checked, the function set reading section 11 reads, from the function set storage section 5, the function set selected by the user. On the other hand, for the function for which the checkbox 43 is not checked, the function set reading section 11 reads a parameter initial value(s) from the initial value storage section 4 (Step 180). Then, the parameter value(s) read from the respective sections are set on the parameter setting screen, and are displayed on the operation panel 23 by the screen display section 7 (Step 190). Thereafter, the user performs a predetermined job execution operation, and the job execution section 3 executes a job in accordance with the parameter value set as described above.

Exemplary Embodiment 2

In the exemplary embodiment 1, when a function set is to be registered in the function set storage section 5, the job memory registration screen shown in FIG. 5 is used as a user interface. On the other hand, in the present exemplary embodiment, a user interface different from that of the exemplary embodiment 1 is provided. FIG. 9 is a diagram showing a display example of a job memory registration screen according to the present exemplary embodiment. It should be noted that the block configuration and hardware configuration of the multifunction machine 20 according to the present exemplary embodiment may be similar to those of the exemplary embodiment 1 which are described with reference to FIGS. 1 and 2.

Hereinafter, a process for registering a function set in the function set storage section 5 according to the present exemplary embodiment will be described. The basics of the process may be similar to those of the process performed in the exemplary embodiment 1. Therefore, description will be made with reference to the flow chart shown in FIG. 4, and description on the same steps will be omitted as deemed appropriate.

In response to a request from a user, the screen display section 7 displays a job memory registration screen on the operation panel 23 (Step 110). The job memory registration screen displayed in this case is shown in FIG. 9. In the exemplary embodiment 1, the job memory registration screen is provided with the single checkbox 42 for selecting either (i) registration of parameter values being performed in a divided manner based on function-by-function basis or (ii) registration of parameter values being performed in a collective manner as in the related art. However, in the present exemplary embodiment, checkboxes 48, each of which is provided as a group selection component, are associated with the respective function names.

Upon reception of a job memory registration instruction by detecting a selection operation which is performed on the registration button 41 in the job memory registration screen (Step 120), the job memory function processing section 2 first confirms selection states of the checkboxes 48 in response to this registration instruction (Step 130). When the user has checked the checkbox 48 corresponding to the reading system function but has not checked the checkbox 48 corresponding to the printing/outputting system function as illustrated in FIG. 9, the function set registration section 10 generates a function set for the reading system function based on sets of parameter names and setting values related to the checked reading system function (Step 140), and registers the generated function set in the job memory 5 (Step 150). On the other hand, no function set is generated for the unchecked printing/outputting system function.

More specifically, in the exemplary embodiment 1, when an instruction for divided registration is given by checking the checkbox 42, a function set is generated for all functions of the multifunction machine 20, i.e., for each of the reading system function and the printing/outputting system function in the example of the exemplary embodiment 1. To the contrary, in the present exemplary embodiment, a function set will be generated only for the checked function by checking the checkbox 48 associated with the function for which the function set is generated. Thus, in the present exemplary embodiment, a function set is generated for the function set name "Double-Sided Left Bound Reading" shown in FIG. 6, but no function set is generated for the function set name "Double-Sided Stapling/Punching 2-up Printing" shown in FIG. 6.

A parameter value setting process which is performed using the function set registered in the function set storage section 5 is similar to that performed in the exemplary embodiment 1, and therefore, description thereof will be omitted.

Exemplary Embodiment 3

In the exemplary embodiment 1, the job memory registration screen is provided to allow parameter values to be registered as a function set in the function set storage section 5 on a function-by-function basis. Furthermore, in the exemplary embodiment 2, the job memory registration screen is provided to allow, for each function, a selection to be made as to whether registration of each function set should be performed. On the other hand, in the present exemplary embodiment, a user interface which is further different from those of the exemplary embodiments 1 and 2 is provided.

FIG. 10 is a diagram showing a display example of a job memory registration screen according to the present exemplary embodiment. It should be noted that the block configuration and hardware configuration of the multifunction machine 20 according to the present exemplary embodiment may be similar to those of the exemplary embodiment 1 which are described with reference to FIGS. 1 and 2.

Hereinafter, a process for registering a function set in the function set storage section 5 according to the present exemplary embodiment will be described. The basics of the process are similar to those of the process which is performed in the exemplary embodiment 1. Therefore, description will be made with reference to the flow chart shown in FIG. 4, and description on the same steps will be omitted as deemed appropriate.

In response to a request from a user, the screen display section 7 displays a job memory registration screen on the operation panel 23 (Step 110). The job memory registration screen displayed in this case is shown in FIG. 10. In the exemplary embodiment 2, the checkboxes 48 each of which is provided as a group selection component are associated with the respective function names. The present exemplary embodiment further associates checkboxes 49 each of which is provided as an item selection component with the respective parameter names.

Upon reception of a job memory registration instruction by detecting a selection operation performed on the registration button 41 (Step 120), the job memory function processing section 2 first confirms selection states of the checkboxes 48 in response to this registration instruction (Step 130). When the user has checked the checkbox 48 corresponding to the reading system function as illustrated in FIG. 10, the function set registration section 10 further confirms as to whether or not the checkboxes 49 associated with the respective parameters belonging to the reading system function are checked. In the screen display example of FIG. 10, all the checkboxes 49 of the reading system function are checked. Therefore, similarly to the process of the exemplary embodiment 2, the function set registration section 10 generates a function set of the reading system function based on the sets of the parameter names and the setting values related to the checked reading system function (Step 140). Then, the function set registration section 10 registers the generated function set in the function set storage section 5 (Step 150). On the other hand, for the printing/outputting system function, the checkboxes 49 corresponding to "Stapling" and "Punching" are not checked. Therefore, the function set registration section 10 generates a function set of the printing/outputting system function based on the sets of the parameter names and the setting values for the parameters belonging to the printing/outputting system function except "Stapling" and "Punching", the checkboxes 49 for which are not checked (Step 140). Then, the function set registration section 10 registers the generated function set in the function set storage section 5 (Step 150).

FIG. 11 is a diagram showing a data structure example of a job memory and data structure examples of function sets according to the present exemplary embodiment. The checkboxes 49 of all parameters for the function set of the reading system function have been checked. Therefore, the function set having contents similar to those of the exemplary embodiments 1 and 2 is registered. On the other hand, for the function set of the printing/outputting system function, the checkboxes 49 corresponding to "Stapling" and "Punching" have not been checked. Therefore, as can be seen from a comparison with the contents of the job memory used in the exemplary embodiment 1 and shown in FIG. 6, the parameter values of "Stapling" and "Punching" are not included.

It should be noted that a parameter value setting process which is performed using the function set registered in the function set storage section 5 is similar to that performed in the exemplary embodiment 1. Therefore, description thereof will be omitted.

Actually, in the present exemplary embodiment, if one checkbox 49 is checked, a parameter value corresponding thereto is registered in the function set storage section 5. Accordingly, if one checkbox 49 is checked on the user interface, a checkbox 48 of a function including a parameter corresponding to this checkbox 49 may also be automatically checked. Further, if a checkbox 48 of a function is checked, checkboxes 49 of parameters belonging to the function corresponding to this checkbox 48 may also be automatically checked. More specifically, instead of checking each checkbox 49 corresponding to the parameter that is desired to be registered in the function set storage section 5 in addition to the checkbox 48, a user will uncheck, among the automatically checked checkboxes 49, a checkbox 49 corresponding to a parameter that does not have to be registered in the function set storage section 5. As described above, as for automatic settings regarding checking of the respective checkboxes 48 and 49, various patterns are conceivable. Therefore, based on the number of parameters and the like, suitable design may be used to determine which pattern should be adopted.

Each of the foregoing exemplary embodiments has been described based on the examples in which the two functions, including the reading system function and printing/outputting system function, are provided as the functions used for job execution. However, the number of functions into which parameters (setting items) are grouped and a method for classifying functions are not limited to such examples.

FIG. 12 is a diagram showing an example when setting items are grouped by function classification different from those described above. In a list of functions and setting items shown in FIG. 12, there are illustrated (i) function types, (ii) setting items belonging to the respective functions, (iii) setting values that can be set for the respective setting items, and (iv) setting item classification that are used when the setting items belonging to the respective functions are divided into plural groups. The setting items may be grouped according to this list.

Further, in each of the foregoing exemplary embodiments, the different job memory registration screen is provided as an interface for registering setting items in the function set storage section 5. However, instead of exclusively using the job memory registration screen, plural job memory registration screens may be prepared and selectively used.

Furthermore, in the present exemplary embodiments, setting items are grouped so as to meet a predetermined grouping condition that the setting items are divided on a function-by-function basis. However, the setting items do not necessarily have to be divided into groups on a function-by-function basis. Alternatively, the setting items may be grouped so as to meet a different grouping condition.

As set forth above, the foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a storage device configured to store an execution condition that associates setting items which are set for execution of a process with setting values for the setting items;
at least one processor which executes:
 a first designating unit by which one or more of a plurality of functions are designated, the functions comprising a reading function, a printing and outputting function, a scanning function, a printing function, a facsimile transmission function, and an image transmission function,
 wherein each function of the plurality of functions comprise one or more setting items with one or more associated setting values, and
 wherein each function of the plurality of functions is individually designatable for registering in the storage device the setting items that are used to define the execution condition;
 a second designating unit by which a part of the settings items is designated, from among the one or more setting items
 a registration unit that registers, in the storage device, the part of the setting items designated by the second designating unit and associated setting values for the corresponding part of the setting items as a function setting group comprising the part of the setting items indicating which of the setting items are used to define the execution condition; and
 a setting unit, wherein when the function setting group is selected to execute the process, the setting unit sets the associated setting values for the corresponding part of the setting items to the selected function setting group stored in the storage device;
 a third designating unit which designates a divided registration of the designated part of the setting items, and
 wherein, in response to the divided registration being designated and the one or more function setting groups being designated, the setting values set for the part of the setting items are grouped by the registration unit in association with a corresponding function setting group to indicate which of the setting items are used to define the execution condition, and registered in the storage device as grouped settings in association with the corresponding function setting group.

2. The information processing apparatus according to claim 1, wherein the second designating unit designates as the part of the setting items, at least one setting item included in the function setting group, and the registration unit registers the at least one setting item included in the function setting group designated by the second designating unit and at least one associated setting value for the at least one setting item in the function setting group.

3. The information processing apparatus according to claim 1, wherein when an instruction that requires the execution condition to be registered for each function setting group in which the corresponding part of the setting items are included is given, the second designating unit designates, for each function setting group, at least one setting item included in the function setting group as the part of the setting items, and the registration unit registers, for each said function setting group, the at least one setting item included in each function setting group designated by the second designating unit and at least one associated setting value for the at least one setting item in the function set for each said function setting group.

4. The information processing apparatus according to claim 1, wherein the setting items are divided into one or more function setting groups that realize the process.

5. The information processing apparatus according to claim 1, wherein the function setting group is registered in the registration unit individually for each function setting group.

6. The information processing apparatus according to claim 1, wherein in response to the divided selection being designated and the function setting group being selected, other setting values, other than the associated setting values set for the part of the setting values being grouped by the registration unit for each selected function setting group, are not registered by the registration unit in the storage device.

7. The information processing apparatus according to claim 1, wherein a registrant name and an identification number of the registrant are added to the registered setting values in response to the registration unit registering the setting values set for the part of the settings being grouped by the registration unit for each selected function setting group.

8. An information processing method, wherein a storage device configured to store an execution condition that associates setting items which are set for execution of a process with setting values for the setting items, the method comprising:

designating one or more of a plurality of functions, the functions comprising a reading function, a printing and outputting function, a scanning function, a printing function, a facsimile transmission function, and an image transmission function, wherein each function of the plurality of functions comprise one or more setting items with one or more associated setting values, and wherein each function of the plurality of functions is individually designatable for registering in the storage device the setting items that are used to define the execution condition;

designating, a part of the setting items, from among the one or more setting items;

registering, in the storage device, the part of the setting items designated and associated setting values for the corresponding part of the setting item as a function setting group comprising the part of the setting items indicating which of the setting items are used to define the execution condition; and when the function setting group is selected to execute a process, setting the associated setting values for the corresponding part of the setting items to the selected function setting group stored in the storage device, wherein, in response to a divided registration selection being designated and the one or more function setting groups being designated, the setting values set for the part of the setting items are grouped during the registering in association with a corresponding function setting group to indicate which of the setting items are used to define the execution condition, and registered in the storage device as grouped settings in association with the corresponding function setting group.

9. The information processing method according to claim 8, wherein the designating designates as the part of the setting items, at least one setting item included in the function setting group, and the registering registers the designated at least one setting item included in the function setting group and at least one associated setting value for the selected at least one setting item in the function setting group.

10. The information processing method according to claim 8, wherein when an instruction that requires the execution condition to be registered for each function setting group in which the corresponding part of the setting items are included is given, the designating designates, for each function setting group, at least one setting item included in the function setting group as the part of the setting items, and the registering registers, for each said function setting group, the designated at least one setting item included in each function setting group and at least one associated setting value for the selected at least one setting item in the function set for each said function setting group.

11. The information processing method according to claim 8, wherein the setting items are divided into one or more function setting groups that realize the process.

12. The information processing method according to claim 8, wherein the function setting group is registered individually for each function setting group.

13. A non-transitory computer-readable medium storing a program that causes a computer to execute information processing, wherein the computer comprises a storage device configured to store an execution condition that associates setting items which are set for execution of a process with setting values for the setting items, the information processing comprising:

designating one or more of a plurality of functions, the functions comprising a reading function, a printing and outputting function, a scanning function, a printing function, a facsimile transmission function, and an image transmission function, wherein each function of the plurality of functions comprise one or more setting items with one or more associated setting values, and wherein each function of the plurality if functions is individually designatable for registering in the storage device the setting items that are used to define the execution condition;

designating, a part of the setting items, from among the one or more setting items;

registering, in the storage device, the part of the setting items designated and associated setting values for the corresponding part of the setting item as a function setting group comprising the part of the setting items indicating which of the setting items are used to define the execution condition for the execution of the process; and when the function setting group is selected to execute the process, setting the associated setting values for the corresponding part of the setting items to the designated function setting group stored in the storage device, wherein, in response to a divided registration selection being designated and the one or more function setting groups being designated, the setting values set for the part of the setting items are grouped during the registering in association with a corresponding function setting group to indicate which of the setting items are used to define the execution condition, and registered in the storage device as grouped settings in association with the corresponding function setting group.

14. The non-transitory computer readable medium according to claim 13, wherein the determining designates as the part of the setting items, at least one setting item included in the function setting group, and the registering registers the designated at least one setting item included in the function setting group and at least one associated setting value for the selected at least one setting item in the function setting group.

15. The non-transitory computer readable medium of claim 13, wherein when an instruction that requires the execution condition to be registered for each function setting group in which the corresponding part of the setting items are included is given, the designating designates, for each function setting group, at least one setting item included in the function setting group as the part of the setting items, and the registering registers, for each said function setting group, the designated at least one setting item included in each function setting group and at least one associated setting value for the selected at least one setting item in the function set for each said function setting group.

16. The non-transitory computer readable medium of claim 13, wherein the setting items are divided into one or more function setting groups that realize the process.

17. The non-transitory computer readable medium of claim 13, wherein the function setting group is registered individually for each function setting group.

* * * * *